C. ELKIN.
HOSE COUPLING.
APPLICATION FILED MAR. 27, 1917.
1,289,714.
Patented Dec. 31, 1918.
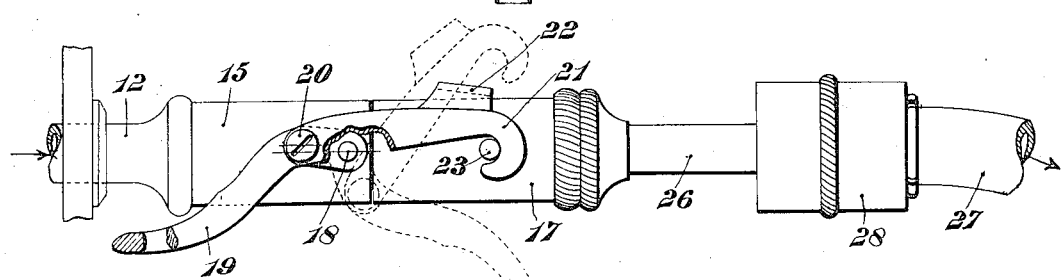
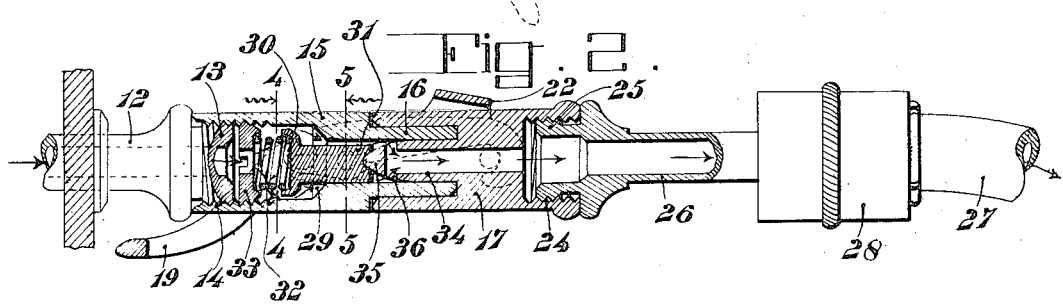
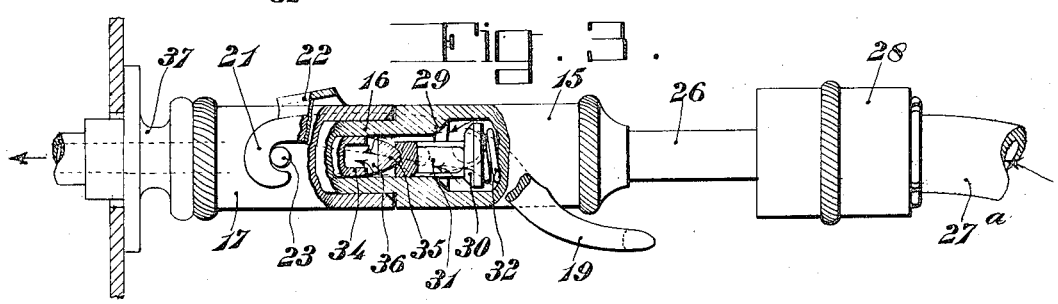
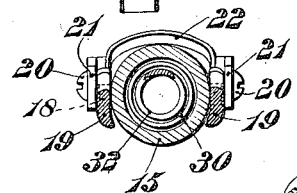
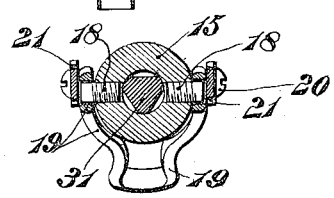
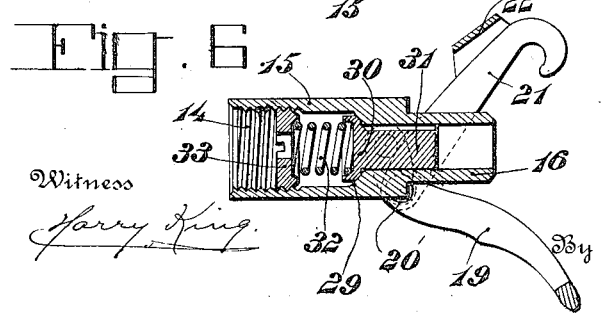
Witness
Harry King.
Inventor
Charles Elkin
By
Attorneys

UNITED STATES PATENT OFFICE.

CHARLES ELKIN, OF NEW YORK, N. Y.

HOSE-COUPLING.

1,289,714.  Specification of Letters Patent.  Patented Dec. 31, 1918.

Application filed March 27, 1917. Serial No. 157,672.

*To all whom it may concern:*

Be it known that I, CHARLES ELKIN, a citizen of the United States, residing at New York, in the county of New York and State of New York, have invented or discovered certain new and useful Improvements in Hose-Couplings, of which the following is a specification, reference being had therein to the accompanying drawings.

This invention relates to valved hose or pipe couplings, or couplings of the type employing valves for automatically closing the fluid passages therethrough when the members of said couplings are disconnected, in order to prevent the escape of fluid from the conduits joined thereby.

The invention has for its object the provision of an improved coupling of this character of relatively simple and inexpensive construction which, when connected, affords an efficient joint secure against leakage, which, when disconnected, will absolutely prevent the escape of fluid therefrom even when said fluid is under high pressure, which may be easily and quickly connected, which, when so connected, operates automatically to open the passage through the coupling irrespective of the fluid pressure carried, and which is otherwise well qualified to fulfil all of the requirements of such a device.

The foregoing and other objects of the invention, together with means whereby the same may be carried into effect, will best be understood from the following description of certain forms or embodiments thereof illustrated in the accompanying drawings, in which—

Figure 1 is a side elevation, partly broken away, showing in full lines the coupling members in coupled position, and illustrating in dotted lines the position of the parts for uncoupling.

Fig. 2 is a longitudinal section through the coupling member shown in Fig. 1.

Fig. 3 is an elevation, partly in section, illustrating another application of the invention.

Fig. 4 is a section on line 4—4, and Fig. 5 a section on line 5—5, Fig. 2.

Fig. 6 is a sectional view of the valved coupling member shown in Fig. 2 with the coöperating coupling member disconnected therefrom.

In Figs. 1 and 2 the invention is illustrated as embodied in a coupling for connecting a source of compressed air with a hose line for conveying the compressed air to any desired point, as for the purpose of inflating automobile tires. 12 denotes the outlet member of the compressed air tank or other source, said member having a threaded nipple 13 which is received in a threaded socket 14 of the coupling member 15. Said coupling member has a projecting nozzle 16 which is received within and substantially fits the recessed end of a complementary coupling member 17.

Pivoted at 18 to the coupling member 15 is an angular bail 19. Pivoted at 20 to the arms of the bail 19, at points slightly in the rear of the pivots 18, are hooks 21, preferably connected by a cross member 22, which hooks are adapted to engage diametrically opposite pins or studs 23 projecting from the coupling member 17.

With the parts in the position shown in dotted lines in Fig. 1 the nozzle 16 may be inserted into the recessed end of the coupling member 17, the hooks 21 engaged with the pins or studs 23, and the bail 19 turned about its pivot 18 into the position shown in full lines in said figure. In this operation the bail 19 and hooks 21 act as a toggle to draw or force the coupling members toward one another, and when the full locking position is reached the axis of the pivots 20 passes across the plane of the axes of the pivots 18 and studs 23, so that the parts are automatically retained in this position.

The coupling member 17 is provided at its outer end with a threaded socket 24 which receives a threaded nipple 25 on the end of a tube 26 to which is secured a hose 27 by any suitable means, herein shown as a clamp 28 of the general type disclosed in Letters Patent No. 1,091,819, granted to me March 31, 1914.

Within the coupling member 15, intermediate the socket 14 and the bore or passage through the nozzle 16, is formed a valve seat 29 with which coöperates a valve 30 having a triangular or non-circular stem 31 extending into and guided by said bore or passage, which is of substantially circular cross-section, thereby providing spaces about said stem and between the same and the walls of said bore through which the fluid may flow. The valve 30 is normally pressed toward the seat 29 by a spring 32 one end of which is received in a recess formed in the back of said valve, or the side thereof opposite the stem 31 and valve seat 29, and the other end of which is received in a recess in a perforated disk 33 located in the socket 14 and having threaded edges engaging the threads of said socket.

The coupling member 17 is provided with an interior key or hollow projecting pin 34 which, when the coupling members are connected, enters and substantially fits the passage in the nozzle 16. The key 34 is provided with a solid head 35, of reduced diameter, which engages the end of the valve stem 31 when the coupling members are joined, thereby forcing the valve 30 from the seat 29 against the tension of the spring 32. In the rear of the head 35 the key 34 is provided with ports or passages 36 communicating with the hollow interior of said key, thereby placing said interior in communication with the passage in the nozzle 16 when the coupling members are connected.

When the coupling members are disconnected the valve 30, as shown in Fig. 6, is forced to its seat 29 by the spring 32, thereby closing the passage through the nozzle 16 and preventing escape of fluid from the coupling member 15. When the coupling members are connected the key 34 unseats the valve 30 as above explained, thereby opening the passage through the coupling. If the fluid pressure is relatively high, as in the case of a tire inflating device, the valve 30 is held to its seat with considerable force by said fluid pressure acting in conjunction with the spring 32, so that considerable force is necessary to unseat the same. It will be seen, however, that the toggle mechanism above described, and comprising the bail 19 and hooks 21, is such as to afford considerable leverage so that a relatively small amount of force applied to the bail 19 causes the coupling members to be drawn together with a greatly increased degree of force, thereby unseating the valve 30 without difficulty, irrespective of the degree of fluid pressure by which the same is held seated. The coupling of the members is further facilitated by the arrangement above described whereby the nipple 16 substantially fits the recessed end of the coupling member 17, and the key 34 and stem 31 substantially fit the passage in said nozzle, so that the parts are automatically guided into their proper coöperative positions by the act of joining them. To further increase this guiding action the head 35 of the key 34, the end of the nozzle 16, and the mouth of the recess in the coupling member 17 are all preferably beveled or chamfered as shown.

In order to render the coupling above described adaptable to a wide range of requirements, the sockets 14 and 24 in the coupling members 15 and 17 are preferably alike as to diameter and threading, so that the coupling as a whole may be turned end for end, as occasion may require, it being understood that the valved coupling member 15 must occupy a position in the direction from which the fluid passing through the coupling flows in order that when the parts are disconnected the flow of said fluid will be stopped. As shown in Figs. 1 and 2 the direction of flow is from left to right, as indicated by the arrows, so that the coupling member 15 occupies a position toward the left. With this arrangement, when the coupling is disconnected, escape of fluid from the outlet 12 is automatically stopped by the seating of the valve 30.

In Fig. 3 the invention is illustrated as applied to the supply tube or hose for a gas stove or the like. In this figure 37 denotes the nipple on the stove to which the tube or hose 27ª is to be attached, the direction of flow of the gas being from right to left, as indicated by the arrows, so that when the coupling is used in this relationship the position of the coupling member 15 is toward the right. Should the coupling be disconnected the valve 30 will be automatically seated, as above explained, thereby preventing the escape of gas coming from the tube 27ª.

Having thus described my invention I claim and desire to secure by Letters Patent:

1. A coupling of the character described comprising a coupling member having an interior passage and a valve seat at the inner end of said passage, a valve within said member coöperating with said seat and having a stem extending into said passage and guided by the walls thereof, a second coupling member having an interior hollow key adapted to enter and fit said passage, said key having a solid head of reduced diameter adapted to engage said valve stem, and having ports in the rear of said head communicating with the hollow interior of said key, one of said coupling members being provided with exterior pins or studs and the other of said members being provided with a hooked toggle lever device by which said coupling members may be secured together.

2. In a coupling of the character described, a coupling member having a socket at one end, an interior passage, circular in cross-section, at its opposite end, and a valve seat intermediate said socket and passage, a valve within said member coöperating with said seat and having a stem, non-circular in cross section, extending into said passage, said stem being guided by the walls of said passage and affording passage-ways between said walls and stem, said valve having a recess in its face opposite said stem and valve seat, a spring having its end seated in said recess, a perforated disk in said socket having a recess in which the opposite end of said spring is received, a second coupling member having a key to engage said valve stem, and toggle-lever means for drawing said coupling members together and for holding them in coupled position.

In testimony whereof I affix my signature.

CHARLES ELKIN.